(12) United States Patent
Hosomi

(10) Patent No.: US 6,282,481 B1
(45) Date of Patent: Aug. 28, 2001

(54) DRIVING FORCE CONTROL APPARATUS FOR VEHICLES

(75) Inventor: Kazushi Hosomi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/584,374

(22) Filed: May 31, 2000

(30) Foreign Application Priority Data

Jun. 3, 1999 (JP) .................................................. 11-156564

(51) Int. Cl.$^7$ .................................................. B60K 17/34
(52) U.S. Cl. ........................... 701/84; 701/53; 701/54; 701/55; 477/110; 477/125
(58) Field of Search ........................... 701/53, 54, 55, 701/84, 85, 90; 477/110, 125, 107, 109, 129

(56) References Cited

U.S. PATENT DOCUMENTS

| | | | | |
|---|---|---|---|---|
| 4,922,424 | * | 5/1990 | Hiramatsu | 701/53 |
| 5,580,330 | * | 12/1996 | Minowa et al. | 477/92 |
| 5,765,657 | * | 6/1998 | Fukumura et al. | 180/197 |
| 5,951,614 | * | 9/1999 | Tabata et al. | 701/54 |
| 6,014,604 | * | 1/2000 | Kuroiwa et al. | 701/54 |
| 6,067,464 | * | 5/2000 | Noda et al. | 701/54 |
| 6,067,801 | * | 5/2000 | Harada et al. | 60/705 |
| 6,094,614 | * | 7/2000 | Hiwatashi | 701/89 |
| 6,115,663 | * | 9/2000 | Yasuda | 701/89 |

FOREIGN PATENT DOCUMENTS 8-61107   3/1996 (JP).

* cited by examiner

Primary Examiner—William A. Cuchlinski, Jr.
Assistant Examiner—Marthe Marc-Coleman
(74) Attorney, Agent, or Firm—Oliff & Berridge, PLC

(57) ABSTRACT

A driving force control apparatus for vehicles prevents a breakdown of a power train and maintains driving force during running, thereby improving driving performance. The driving force control apparatus is constructed to control the driving force distributed through a differential gear unit to a plurality of wheels. The apparatus is arranged to compute permissible torque that can be permitted to enter the differential gear unit, based on a differential rotational speed of the differential gear unit, compute input torque entered into the differential gear unit, and decrease engine power output so as to keep the input torque into the differential gear unit not more than the permissible torque when the input torque is greater than the permissible torque.

10 Claims, 4 Drawing Sheets

DRIVING FORCE CONTROL APPARATUS FOR VEHICLES

BACKGROUND OF THE INVENTION

1. Field of the Invention

The present invention relates to a driving force control apparatus for vehicles and a driving force control method for vehicles, which controls driving force transmitted to the wheels.

2. Related Background Art

An example of the conventionally known driving force control apparatus for vehicles is one constructed to detect an acceleration slip occurring at the driving wheel under acceleration of a vehicle and effect braking at the driving wheel upon occurrence of the acceleration slip, as described in Japanese Patent Application Laid-Open No. 8-61107. This apparatus is intended for such control that the power output of the internal combustion engine is restrained to effect braking at the driving wheel upon occurrence of the acceleration slip, so as to decrease a speed difference between the left and right driving wheels, thereby preventing seizure of the differential.

SUMMARY OF THE INVENTION

Since the conventional apparatus of this type is constructed to control the power output of the internal combustion engine simply when the rotational speed difference between the left and right driving wheels becomes over a predetermined value, there is the possibility that driving force of the internal combustion engine is over-restrained, so as to degrade driving performance of the vehicle, however. For example, when the vehicle runs on a road surface with large running resistance, such as a muddy road or a deep snow road, the road ability is often higher in the case of the vehicle running with maintaining the power output of the internal combustion engine as much as possible. Therefore, the excessive suppression of the driving force of the engine is not preferable in that case.

The present invention has been accomplished in order to solve this problem and an object of the present invention is to provide a driving force control apparatus for vehicles and a driving force control method for vehicles that can maintain the driving force during running while preventing a breakdown of the power train, thereby improving the driving performance.

Namely, a driving force control apparatus for vehicles according to the present invention is a driving force control apparatus for vehicles, which controls driving force distributed through a differential gear unit to a plurality of wheels, the driving force control apparatus comprising: permissible torque computing means for computing permissible torque that can be permitted to enter the differential gear unit, based on a differential rotational speed of the differential gear unit; input torque computing means for computing input torque entered into the differential gear unit; and control means for performing control to decrease engine power output so as to keep the input torque into the differential gear unit not more than the permissible torque when the input torque computed by the input torque computing means is greater than the permissible torque computed by the permissible torque computing means.

The driving force control apparatus for vehicles according to the present invention is also characterized in that the aforementioned control means performs the control to decrease the engine power output by adjusting a throttle opening angle of a throttle valve.

The driving force control apparatus for vehicles according to the present invention is also characterized by further comprising: target torque computing means for setting the permissible torque as target torque of the input torque when the input torque computed by the input torque computing means is greater than the permissible torque computed by the permissible torque computing means; and target throttle opening computing means for computing a target throttle opening angle, based on the target torque and an engine speed, and characterized in that the aforementioned control means performs the control to decrease the engine power output so as to keep the input torque into the differential gear unit not more than the permissible torque, by adjusting the throttle opening angle, based on the target throttle opening angle computed by the target throttle opening computing means.

The driving force control apparatus for vehicles according to the present invention is also characterized in that the permissible torque computing means, the input torque computing means and the control means are ECU.

A driving force control method for vehicles according to the present invention is a driving force control method for vehicles, which controls driving force distributed through a differential gear unit to a plurality of wheels, the driving force control method comprising the steps of: computing permissible torque that can be permitted to enter the differential gear unit, based on a differential rotational speed of the differential gear unit; computing input torque entered into the differential gear unit; and performing control to decrease engine power output so as to keep the input torque into the differential gear unit not more than the permissible torque when the input torque computed is greater than the permissible torque computed.

The driving force control method for vehicles according to the present invention is also characterized in that the steps of performing control to decrease engine power output includes performing the control to decrease the engine power output by adjusting a throttle opening angle of a throttle valve.

The driving force control method for vehicles according to the present invention is also characterized by further comprising the steps of: setting the permissible torque as target torque of the input torque when the input torque computed is greater than the permissible torque computed; and computing a target throttle opening angle, based on the target torque and an engine speed, wherein the step of performing control to decrease engine power output includes performing the control to decrease the engine power output so as to keep the input torque into the differential gear unit not more than the permissible torque, by adjusting the throttle opening angle, based on the target throttle opening angle computed.

According to the invention described above, the input torque entered into the differential gear unit is controlled at or below the given permissible value, whereby an overload can be prevented from being exerted on the differential gear unit. On the other hand, the driving force is not restrained when the input torque into the differential gear unit is not more than the given permissible value. When the input torque is greater than the given permissible value, the engine power output can be controlled so as to keep the input torque at the upper limit of the permissible value. Therefore, the constant driving force is maintained and the driving performance of the vehicle can be improved thereby.

The driving force control apparatus for vehicles according to the present invention is also characterized by further comprising traction control means whereby when a slip occurs in either of the wheels, braking force is exerted on the wheel to restrain the slip.

The driving force control method for vehicles according to the present invention is also characterized by further comprising the steps of: braking force is exerted on the wheel to restrain the slip when a slip occurs in either of the wheels.

According to the invention, the braking force is exerted on the slipping wheel, so as to decrease the differential rotational speed of the differential gear unit, whereby the durability of the differential gear unit is improved further.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Embodiments of the present invention will be described in detail by reference to the accompanying drawings. In the description of the drawings like elements will be denoted by like symbols and redundant description will be avoided.
(First Embodiment)

Figure 1:
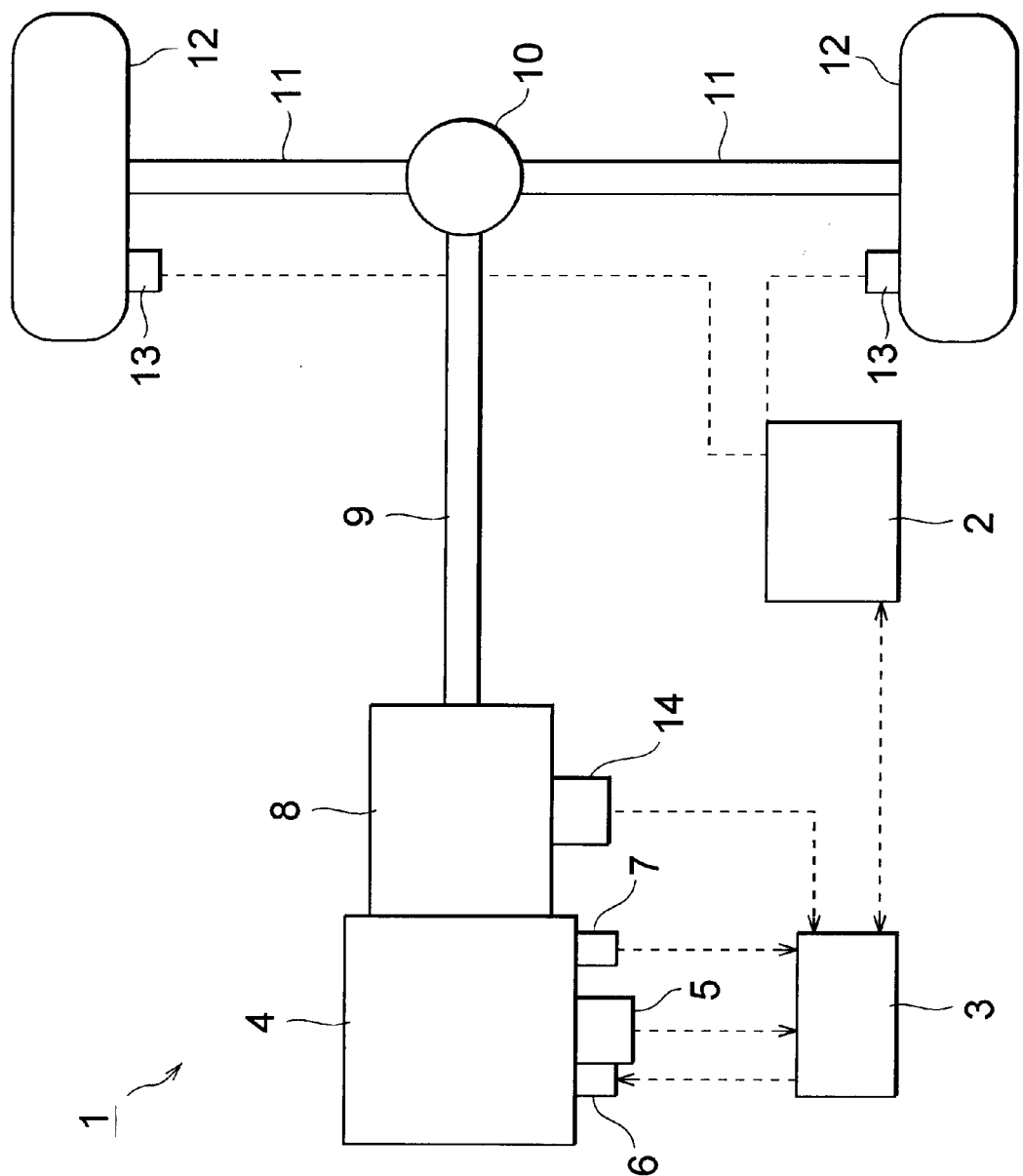
FIG. 1 is a structural diagram of the driving force control apparatus for vehicles according to the first embodiment.

FIG. 1 shows the structure of the driving force control apparatus for vehicles according to the present embodiment. As illustrated in FIG. 1, the driving force control apparatus 1 is provided with an ECU 2. The ECU 2 conducts the global control of the driving force control apparatus 1 and is mainly composed of a computer incorporating a CPU, a ROM, and a RAM. The ROM stores various control routines including a driving force control routine.

The driving force control apparatus 1 is also provided with a fuel injection control unit 3. The fuel injection control unit 3 controls supply of fuel to an engine 4 and is arranged to compute an optimum fuel injection amount according to a running condition of the vehicle, based on intake air volume, engine speed, throttle opening angle, water temperature, intake air temperature, etc., and allow injectors (not illustrated) to inject the optimum amount of fuel into cylinders. The fuel injection control unit 3 is coupled to the ECU 2, whereby they are allowed to exchange data etc. based on various input signals with each other.

The driving force control apparatus 1 is provided with a throttle position sensor 5. The throttle position sensor 5 is a sensor for detecting an opening angle (stroke) of the throttle valve (not illustrated). The throttle position sensor 5 is connected to the fuel injection control unit 3 and outputs a throttle position signal according to the opening angle of the throttle valve to the fuel injection control unit 3. The driving force control apparatus 1 is also equipped with a throttle actuator 6. The throttle actuator 6 opens or closes the throttle valve in response to a control signal from the fuel injection control unit 3.

The driving force control apparatus 1 also has an engine speed sensor 7. The engine speed sensor 7 detects the rotational speed of the engine 4 and is, for example, a crank position sensor or the like. This engine speed sensor 7 is connected to the fuel injection control unit 3 and outputs an engine speed signal according to the engine rotational speed to the fuel injection control unit 3.

A transmission 8 is installed next to the engine 4. The driving force generated in the engine 4 is transmitted via the transmission 8, propeller shaft 9, differential gear unit 10, and drive shafts 11 to wheels 12, which are driving wheels.

The differential 10 is a unit for absorbing a difference between rotational speeds of the wheels 12, 12 connected to the left and right drive shafts 11, 11 to facilitate rotation of the wheels 12, 12 and is, for example, one using bevel gears. The driving force transmitted through the propeller shaft 9 is distributed through the differential 10 to each drive shaft 11.

The transmission 8 is provided with a gear position sensor 14. The gear position sensor 14 is a sensor for detecting a state of a gear ratio of the transmission 8.

Each wheel 12 is equipped with a wheel speed sensor 13 for detecting the rotational speed of the wheel 12. The wheel speed sensors 13 are coupled to the ECU 2 and each sensor outputs a rotational speed signal of the associated wheel 12 to the ECU 2.

Next, the operation of the driving force control apparatus will be described.

Figure 2:
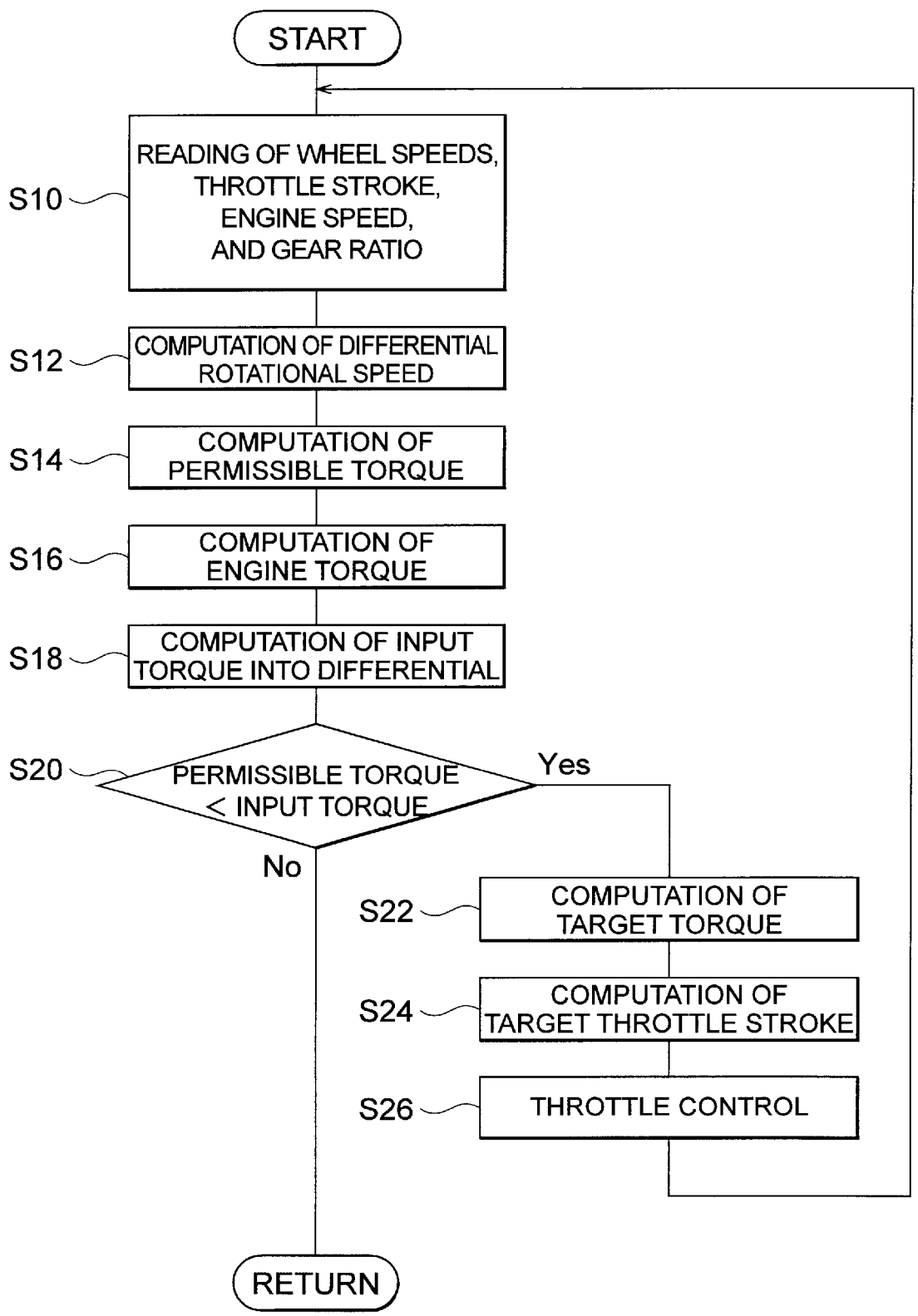
FIG. 2 is a flowchart to show the operation of the driving force control apparatus for vehicles according to the first embodiment.

FIG. 2 is a flowchart to show the operation of the driving force control apparatus. In FIG. 2, control processing is initiated with on of the ignition switch, and the first step is step S10 (hereinafter referred to simply as "S10"; note that the same also applies to the other steps) to read each of the wheel speeds at the respective wheels 12, the throttle opening angle of the throttle valve, the engine speed, and the gear ratio of the transmission 8.

The wheel speeds are read, based on the output signals from the wheel speed sensors 13. The throttle opening angle is read based on the output signal of the throttle position sensor 5 supplied via the fuel injection control unit 3 to the ECU 2. The engine speed is read based on the output signal of the engine speed sensor 7 supplied via the fuel injection control unit 3 to the ECU 2. Further, the gear ratio of the transmission 8 is read based on the output signal of the gear position sensor 14 supplied via the fuel injection control unit 3 to the ECU 2.

Figure 3:
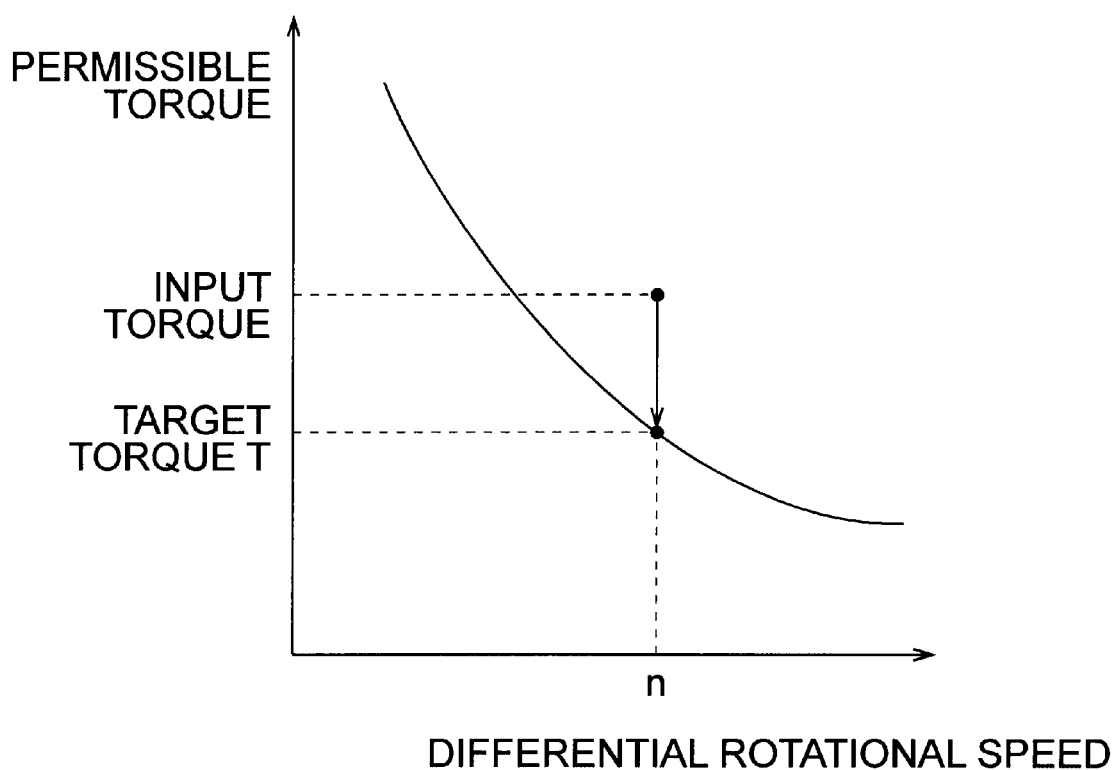
FIG. 3 is a diagram to show the relation between differential rotational speed of the differential and permissible torque in the driving force control apparatus for vehicles according to the first embodiment.

Then the flow transfers to S12 to compute differential rotational speed of the differential 10. The differential rotational speed is computed based on the wheel speeds of the wheels 12, 12. Next, the flow goes to S14 to compute permissible torque. The "permissible torque" stated herein is the maximum of torque that can be permitted to enter the differential 10, and is set according to the structure, mechanical strength, etc. of the differential 10. The computation of the permissible torque is carried out, for example, by map processing using a map concerning differential rotational speed versus permissible torque as illustrated in FIG. 3. This map of FIG. 3 is preliminarily stored in the ECU 2 in consideration of the structure etc. of the differential 10.

Then the flow goes to S16 to compute engine torque. The engine torque is computed based on the throttle opening angle and the engine speed read above and the computation is carried out, for example, by map processing of uniquely determining the engine torque from the throttle opening angle and the engine speed, using a map preliminarily stored in the ECU 2.

Then the flow moves to S18 to compute input torque (input torque into the differential). The "input torque" stated herein means torque entered through the propeller shaft 9 into the differential 10. The computation of this input torque is carried out based on the gear ratio of the transmission 8 read above and the engine torque acquired in the computation of S16, and is executed, for example, by map processing of uniquely determining the input torque from the gear ratio and the engine torque, using a map preliminarily stored in the ECU 2.

Then the flow moves to S20 to determine whether the input torque gained in the computation of S18 is larger than the permissible torque gained in the computation of S14. When it is determined in this S20 that the input torque is not greater than the permissible torque, the control processing is terminated.

When in S20 it is determined on the other hand that the input torque is greater than the permissible torque, the flow transfers to S22 to compute target torque. The "target torque" stated herein means a target value of the input torque to be entered into the differential 10. The computation of this target torque is carried out by setting the target value of the input torque of the differential 10, i.e., the target torque as the permissible torque. For example, in FIG. 3, when the present differential rotational speed of the differential 10 is n, the permissible torque corresponding to the differential rotational speed n is derived as the target torque T.

Next, the flow goes to S24 to compute a target throttle opening angle. The computation of the target throttle opening angle is carried out based on the target torque T gained in the computation of S22 and the engine speed, and is executed, for example, by map processing of uniquely determining the target throttle opening angle from the target torque T and the engine speed, using a map preliminarily stored in the ECU 2.

Then the flow transfers to S26 to carry out throttle control. The throttle control is a control process of reducing the input torque into the differential 10, wherein the ECU 2 outputs a control signal via the fuel injection control unit 3 to the throttle actuator 6 to control the open/close state of the throttle valve to adjust the power output of the engine 4. Specifically, the engine output is adjusted by regulating the opening angle of the throttle valve so as to match with the target throttle opening angle gained in S24. This reduces the input torque entered through the propeller shaft 9 into the differential 10 down to the permissible torque, whereby the differential 10 can be prevented from breaking down. Therefore, durability of the differential 10 can be improved.

As described above, the driving force control apparatus 1 according to the present embodiment can prevent an overload from being exerted on the differential 10, because the input torque into the differential 10 is controlled at or below the given permissible torque. On the other hand, the driving force is not restrained when the input torque into the differential 10 is not more than the given permissible torque. Therefore, the driving force is maintained. When the input torque is greater than the given permissible torque, the engine output is controlled so that the input torque is reduced to the permissible torque, i.e., to the upper limit of torque permitted to enter. Therefore, the constant driving force can be maintained with reliability, so as to improve the driving performance of the vehicle.

In the driving force control apparatus 1 according to the present embodiment described above, the engine output is restrained by carrying out the throttle control when the input torque into the differential 10 is greater than the permissible torque, but the driving force control apparatus for vehicles according to the present invention is not limited to the above embodiment. For example, the means for controlling the decrease of the engine output may also be a means employing fuel cut control or cylinder reduction control to suppress or stop supply of fuel.

(Second Embodiment)

Next, the driving force control apparatus for vehicles according to the second embodiment will be described.

The driving force control apparatus 1 according to the first embodiment had the structure wherein the driving force of the vehicle was restrained by carrying out the decrease control of the engine output when the input torque into the differential 10 was greater than the permissible torque, but the driving force control apparatus according to the present invention does not always have to be limited thereto and may also adopt a traction control means for controlling the braking force at the slipping wheel 12, in addition to the decrease control means of the engine output, as the means for restraining the driving force of the vehicle.

Figure 4:
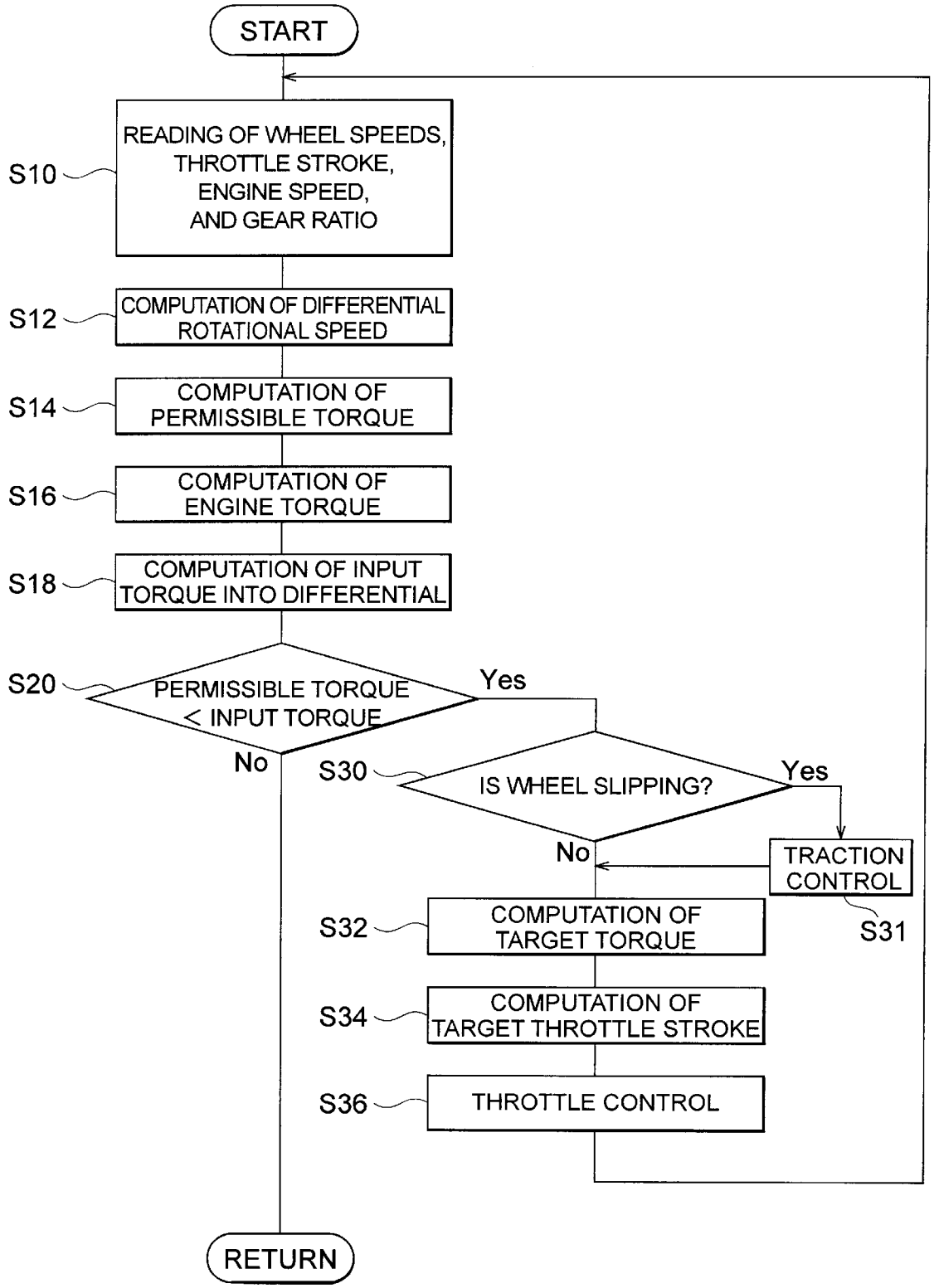
FIG. 4 is a flowchart to show the operation of the driving force control apparatus for vehicles according to the second embodiment.

For example, as illustrated in FIG. 4, when it is determined in S20 that the input torque is greater than the permissible torque, the flow goes to S30 to determine whether either of the wheels 12 is slipping. At this time, whether either of the wheels 12 is slipping can be determined based on the wheel speeds read in S10. When it is determined in S30 that a wheel 12 is slipping, the flow goes to S31 to perform traction control. The traction control is control of exerting the braking force on the slipping wheel 12 to stop the slip.

When it is determined in S30 on the other hand that no wheel 12 is slipping, the flow transfers to the steps S32 to S36 to carry out the computation of the target torque, the computation of the target throttle opening angle, and the throttle control sequentially. The computation of the target torque in S32 is executed based on an operation similar to S22 described above. The computation of the target throttle opening angle in S34 is executed based on an operation similar to S24 described above. Further, the throttle control in S36 is executed based on an operation similar to the throttle control in S26 described above.

In the driving force control apparatus and the driving force control method according to the present embodiment as described above, the differential rotational speed of the differential 10 can be decreased, because the braking force is exerted on the slipping wheel 12. Therefore, the durability of the differential 10 can be improved further. The driving force of the vehicle can also be restrained quickly by the braking at the wheels 12.

(Third Embodiment)

The driving force control apparatus for vehicles and the driving force control method for vehicles according to the third embodiment will be described below.

The driving force control apparatus for vehicles and the driving force control method for vehicles according to the first embodiment and the second embodiment were described as those used in two-wheel drive vehicles, but the driving force control apparatus for vehicles according to the present invention does not always have to be limited to such examples and may also be used in four-wheel drive vehicles.

For example, an apparatus is constructed to detect the wheel speeds of the four wheels, i.e., the front, rear, left and right wheels, compute permissible torques for respective differential gear units, i.e., front differential, rear differential, and center differential, based on their detected signals, and perform control to decrease the engine power output in accordance with the largest load among these differentials.

The apparatus in this structure can also yield the effect similar to that by the driving force control apparatus according to the first embodiment or the second embodiment.

According to the present invention, as described above, the engine power output is decreased so as to lower the input torque to or below the permissible torque when the input torque into the differential is greater than the given permissible torque. This prevents the differential from breaking down and improves the durability thereof. In addition, the driving performance of the vehicle is improved by maintaining the constant driving force with reliability.

The differential rotational speed of the differential is reduced by use of the traction control means for exerting the braking force on the wheel under slipping, whereby the durability of the differential can be improved further.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A driving force control apparatus for vehicles, which controls driving force distributed through a differential gear unit to a plurality of wheels, said driving force control apparatus comprising:

permissible torque computing means for computing permissible torque that can be permitted to enter said differential gear unit, based on a differential rotational speed of said differential gear unit;

input torque computing means for computing input torque entered into said differential gear unit; and control means for performing control to decrease engine power output so as to keep the input torque into said differential gear unit not more than said permissible torque when said input torque computed by said input torque computing means is greater than said permissible torque computed by said permissible torque computing means.

2. A driving force control apparatus for vehicles, which controls driving force distributed through a differential gear unit to a plurality of wheels, said driving force control apparatus comprising:

ECU which can compute permissible torque that can be permitted to enter said differential gear unit, based on a differential rotational speed of said differential gear unit, compute input torque entered into said differential gear unit and perform control to decrease engine power output so as to keep the input torque into said differential gear unit not more than said permissible torque when said input torque computed is greater than said permissible torque computed.

3. The driving force control apparatus according to claim 1, wherein said control means performs the control to decrease said engine power output by adjusting a throttle opening angle of a throttle valve.

4. The driving force control apparatus according to claim 3, further comprising:

target torque computing means for setting said permissible torque as target torque of said input torque when said input torque computed by said input torque computing means is greater than said permissible torque computed by said permissible torque computing means; and target throttle opening computing means for computing a target throttle opening angle, based on said target torque and an engine speed, wherein said control means performs the control to decrease the engine power output so as to keep the input torque into said differential gear unit not more than said permissible torque, by adjusting the throttle opening angle, based on said target throttle opening angle computed by said target throttle opening computing means.

5. The driving force control apparatus according to claim 1, wherein said permissible torque computing means, said input torque computing means and said control means are ECU.

6. The driving force control apparatus according to claim 1, further comprising traction control means whereby when a slip occurs in either of said wheels, braking force is exerted on said wheel to restrain said slip.

7. A driving force control method for vehicles, which controls driving force distributed through a differential gear unit to a plurality of wheels, said driving force control method comprising the steps of:

computing permissible torque that can be permitted to enter said differential gear unit, based on a differential rotational speed of said differential gear unit;

computing input torque entered into said differential gear unit; and performing control to decrease engine power output so as to keep the input torque into said differential gear unit not more than said permissible torque when said input torque computed is greater than said permissible torque computed.

8. The driving force control method according to claim 7, wherein the steps of performing control to decrease engine power output includes performing the control to decrease said engine power output by adjusting a throttle opening angle of a throttle valve.

9. The driving force control method according to claim 8, further comprising the steps of:

setting said permissible torque as target torque of said input torque when said input torque computed is greater than said permissible torque computed; and computing a target throttle opening angle, based on said target torque and an engine speed, wherein the step of performing control to decrease engine power output includes performing the control to decrease the engine power output so as to keep the input torque into said differential gear unit not more than said permissible torque, by adjusting the throttle opening angle, based on said target throttle opening angle computed.

10. The driving force control method according to claim 7, further comprising the steps of:

braking force is exerted on said wheel to restrain said slip when a slip occurs in either of said wheels.

* * * * *